R. P. PERRY.
PROCESS AND APPARATUS FOR MAKING COMPOSITE SHEETS OF FELT AND THE LIKE.
APPLICATION FILED OCT. 4, 1917.
1,360,313. Patented Nov. 30, 1920.
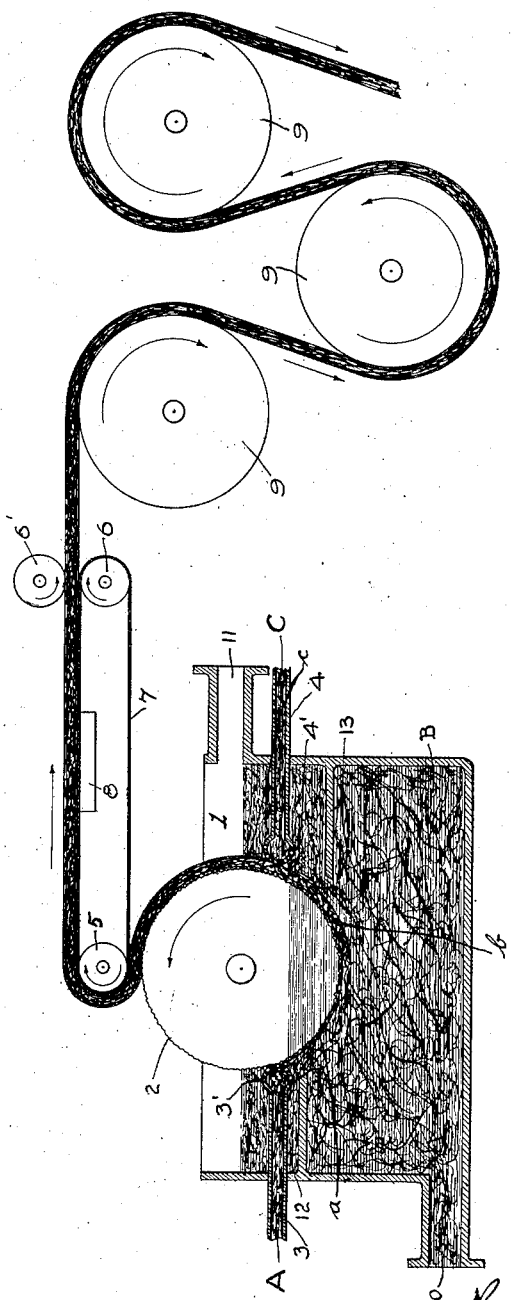
INVENTOR
ATTORNEY

UNITED STATES PATENT OFFICE.

RAY P. PERRY, OF UPPER MONTCLAIR, NEW JERSEY, ASSIGNOR TO THE BARRETT COMPANY, A CORPORATION OF NEW JERSEY.

PROCESS AND APPARATUS FOR MAKING COMPOSITE SHEETS OF FELT AND THE LIKE.

1,360,313.      Specification of Letters Patent.      Patented Nov. 30, 1920.

Application filed October 4, 1917. Serial No. 194,776.

*To all whom it may concern:*

Be it known that I, RAY P. PERRY, a citizen of the United States, residing at Upper Montclair, in the county of Essex and State of New Jersey, have invented certain new and useful Improvements in Processes and Apparatus for Making Composite Sheets of Felt and the like, of which the following is a specification.

The present invention is an improvement on my invention disclosed in my co-pending application bearing Serial No. 162,121, filed April 14, 1917, and entitled "Composite felts and processes of making the same."

In the above entitled application I have disclosed a process and apparatus for making a composite felt consisting broadly of several layers of papermaking material, such as three layers, for example, the outer layers containing none or only a small percentage of comminuted fusible waterproofing material, preferably in filamentary form, and consisting generally of bituminous material, such as pitch or asphalt, while the central layer consists of paper-making material having incorporated therein a comparatively large percentage, often as high as 90% or more, of comminuted fusible water proofing material of the character just referred to. The outer layers are also comparatively thin while the central layer containing the large percentage of comminuted fusible waterproofing material, is comparatively thick and comprises the main body portion of the sheet of felt or paper that is to be formed. The purpose of providing one or more outer layers containing none or only a small percentage of fusible waterproofing material is that if the sheet were to consist principally of the middle layer containing the large percentage of comminuted fusible waterproofing material, due to the presence of such fusible material, the drying operation would be rendered exceedingly difficult, especially when operating on a large or commercial scale. This drying operation is necessary since the paper-making material is formed into a sheet while it is in the form of a watery pulp, the water or moisture content of which must be driven out generally by the application of heat before the sheet is in its finished form.

In the application above referred to I have claimed a process and the resulting article, and have disclosed a device whereby such a composite sheet may be formed in a multi-cylinder paper-making machine, containing as many cylinders as there are layers in the finished composite sheet.

According to my present invention I have devised a process whereby I am enabled to form such a composite sheet in a single cylinder paper-making machine, and my invention comprises not merely such process but also the apparatus wherein such process may be carried out.

Referring to the drawing wherein I have illustrated in diagrammatic form a device wherein my process may be carried out, 1 indicates the usual vat or tank for containing the paper-making material and having the inlet 10 and the overflow outlet 11. Within the vat 1 is the paper-making material B in the form of a watery pulp containing intermixed therewith a comparatively large percentage of comminuted fusible waterproofing material, generally of a bituminous nature such as pitch or asphalt, and preferably in the form of fine hairs, threads or filaments. The mixture of the paper-making material and the comminuted fusible waterproofing material may take place in any desired way, but is generally and preferably effected in the "beaters" in which the pulp is formed, prior to its delivery to the paper-forming vat 1. Within the vat 1 rotates the usual perforated or foraminous screen or similar cylinder 2 on which the layers of the sheet are to be formed. This cylinder 2 rotates in the direction indicated by the arrow. At one point of the revolution of the cylinder is located the inlet tube 3 having the discharge nozzle 3′ which delivers to the sheet-forming screen cylinder 2 paper-making material A containing none or only a small percentage of comminuted fusible waterproofing material of the nature described earlier in this specification. A similar inlet tube 4 provided with the discharge nozzle 4′ is located at another point of the revolution of the sheet forming cylinder 2. In fact any desired number of such inlet pipes and nozzles may be provided, though I prefer to employ one or two such inlet pipes arranged in about the positions illustrated in the drawing. The inlet pipe 4 serves to deliver paper-making material C containing none or only a small percentage of comminuted fusible waterproofing material of the sort previously disclosed.

In its rotation within the vat 1, as a result of a difference in hydrostatic level maintained by any suitable means between the interior and the exterior of the cylinder, as illustrated, a certain suction is maintained within the perforated cylinder 2 which causes a thin layer $a$ to be formed adjacent the cylinder 2 from the material A. In the same way there is formed a comparatively thick layer $b$ from the material B. And where a further layer is desired, there is formed a third and thin layer adjacent the layer $b$, indicated by the reference character $c$, of the material C entering through the pipe 4. In this way there is formed a composite sheet consisting of three layers the outer two layers being comparatively thin and containing none or only a small percentage of comminuted fusible waterproofing material, while the central layer is comparatively thick and contains a comparatively high percentage of such material. This composite sheet is picked up at the "couche" roll by an endless woolen belt 7 mounted on the rolls 5 and 6, there being provided the additional guide roll 6' located opposite the roll 6. A partial removal of the moisture in the sheet is effected by the suction box 8 and by means of the rolls 6 and 6' which serve not merely as guide rolls but also as "press" rolls to press or squeeze out of the sheet a substantial portion of the water contained therein. The sheet at this stage is led to the series of heated drying rolls 9, 9, 9 where the drying is completed and the composite sheet is finished.

By means of the process of my invention and the apparatus devised by me for practising such process, I am enabled to make a composite sheet in a single cylinder paper-making machine, thereby avoiding the use of a plurality of cylinders and considerably simplifying the process and the device in which the same is to be carried out.

In order to prevent the pulp B, which is in a state of constant motion, from substantially becoming mixed with the pulps A and C issuing from the nozzles 3' and 4' of the tubes 3 and 4, respectively, I prefer to provide the baffle members 12 and 13 supported on the inner walls of the vat 1 adjacent to and below the tubes 3 and 4 respectively, all as illustrated in the drawing.

Throughout the specification and claims wherever the terms "point" and "points" appear, I wish to designate by these terms those areas or portions of the sheet-forming cylinder to which a paper-forming material in the form of a watery pulp of given composition is delivered.

What I claim is:

1. The process of forming a composite sheet of felt or paper which comprises supplying a vat from independent sources of supply with watery pulps at points below the overflow from said vat and revolving a sheet-forming cylinder therein while maintaining the pulps substantially separate from each other.

2. The process of forming a sheet of felt or paper composed of a plurality of layers on a single cylinder paper-making machine, comprising the steps of supplying a paper-making material in the form of a watery pulp to one portion of the sheet-forming cylinder, and supplying other paper-making material of different composition in the form of a watery pulp to another portion of the sheet-forming cylinder, both paper making materials being supplied at levels below the overflow from said paper-making machine, whereby the cylinder in its rotation forms a composite sheet the materials of which are intimately felted together.

3. The process of forming a composite sheet of felt or paper on a single cylinder paper-making machine, comprising the steps of supplying a paper-making material in the form of a watery pulp containing none or only a comparatively small percentage of comminuted waterproofing material at one point of the sheet-forming cylinder, providing other paper-making material in the form of a watery pulp containing a comparatively large percentage of comminuted waterproofing material, and supplying said other material to at least one other point of the sheet-forming cylinder, whereby the cylinder in its rotation forms a composite sheet the materials of which are intimately felted together.

4. The process of forming a composite sheet of felt or paper on a single cylinder paper-making machine, comprising the steps of supplying a paper-making material in the form of a watery pulp to a portion of the sheet-forming cylinder below the overflow from said paper-making machine, forming said material into a comparatively thin layer, supplying other paper-making material in the form of a watery pulp to another portion of the sheet-forming cylinder, and forming said last mentioned material into a comparatively thick layer adjacent said first mentioned layer, whereby the said cylinder in its rotation forms a composite sheet the materials of which are intimately felted together.

5. The process of forming a composite sheet of felt or paper on a single cylinder paper-making machine, comprising the steps of supplying a paper-making material in the form of a watery pulp containing none or only a comparatively small percentage of pitch filaments at one point of the sheet-forming cylinder, providing other paper-making material in the form of a watery pulp containing a comparatively large percentage of pitch filaments, and supplying said other materials to at least one other point of the sheet-forming cylinder, whereby the cylinder in its rotation forms a composite sheet the materials of which are intimately felted together.

6. The process of forming a composite sheet of felt or paper on a single cylinder paper-making machine, comprising the steps of supplying a paper-making material in the form of a watery pulp at one point of the sheet-forming cylinder, supplying other paper-making material in the form of a watery pulp at another point of the sheet-forming cylinder, and supplying still other paper-making material in the form of a watery pulp at at least one other point of the sheet-forming cylinder whereby the said cylinder in its rotation forms a composite sheet of at least three layers, the several layers being intimately felted together.

7. The process of forming a composite sheet of felt or paper on a single cylinder paper-making machine, comprising the steps of supplying a paper-making material in the form of a watery pulp containing none or only a comparatively small percentage of comminuted waterproofing material at one point of the sheet-forming cylinder, supplying other paper-making material in the form of a watery pulp containing a comparatively large percentage of comminuted waterproofing material at another point of the sheet-forming cylinder, and supplying still other paper-making material in the form of a watery pulp containing none or only a comparatively small percentage of comminuted waterproofing material at at least one other point of the sheet-forming cylinder whereby the said cylinder in its rotation forms a composite sheet of at least three layers, the several layers being intimately felted together.

8. The process of forming a composite sheet of felt or paper on a single cylinder paper-making machine, comprising the steps of supplying a paper-making material in the form of a watery pulp containing none or only a comparatively small percentage of comminuated bituminous material at one point of the sheet-forming cylinder, supplying other paper-making material in the form of a watery pulp containing a comparatively large percentage of comminuted bituminous material at another point of the sheet-forming cylinder, and supplying still other paper-making material in the form of a watery pulp containing none or only a comparatively small percentage of comminuted bituminous material at at least one other point of the sheet-forming cylinder, whereby the said cylinder in its rotation forms a composite sheet of at least three layers, the several layers being intimately felted together.

9. The process of forming a composite sheet of felt or paper on a single cylinder paper-making machine, comprising the steps of supplying a paper-making material in the form of a watery pulp containing none or only a comparatively small percentage of pitch filaments at one point of the sheet-forming cylinder, supplying other paper-making material in the form of a watery pulp containing a comparatively large percentage of pitch filaments at another point of the sheet-forming cylinder, and supplying still other paper-making material in the form of a watery pulp containing none or only a comparatively small percentage of pitch filaments at at least one other point of the sheet-forming cylinder whereby the said cylinder in its rotation forms a composite sheet of at least three layers, the several layers being intimately felted together.

10. In an apparatus for forming a composite sheet of paper or felt, a pulp vat divided into several feeding compartments, said vat being provided with a paper-making cylinder the surface of which passes from one compartment to another.

11. In an apparatus for forming a composite sheet of paper or felt, a pulp vat divided into several compartments, means for feeding said compartments independently with paper pulps, a paper-making cylinder revolubly mounted in said vat so that its surface passes from one compartment to another.

12. In an apparatus for forming a composite sheet of felt or paper, a container, a perforated paper-forming cylinder mounted within the container, means for supplying paper-making material in the form of a watery pulp within the container and in contact with a portion of the cylinder, means for supplying other paper-making material in the form of a watery pulp at a point of that portion of the cylinder with which the first-mentioned material is in contact, and baffle means for preventing any undesirable mixture of the two materials.

13. In an apparatus for forming a composite sheet of felt or paper, a container, a perforated paper-forming cylinder mounted within the container, means for supplying paper-making material in the form of a watery pulp within the container and in contact with a portion of the cylinder, and means located a comparatively small distance below the level of the said material for supplying other paper-making material in the form of a watery pulp at a point of that portion of the cylinder with which the first mentioned material is in contact.

14. In an apparatus for forming a composite sheet of felt or paper, a container, a perforated paper-forming cylinder mounted within the container, means for supplying paper-making material in the form of a watery pulp within the container and in contact with a portion of the cylinder, means located a comparatively small distance below the level of the said material for supplying other paper-making material in the form of a watery pulp at a point of that portion of the cylinder with which the first-mentioned material is in contact, and baffle means for preventing any undesirable mixture of the two materials.

15. In an apparatus for forming a composite sheet of felt or paper, a container, a perforated paper-forming cylinder mounted within the container, means for supplying paper-making material in the form of a watery pulp within the container and in contact with a portion of the cylinder, and a plurality of means located a comparatively small distance below the level of the said material for supplying other paper-making material in the form of watery pulp at a plurality of points of that portion of the cylinder with which the first-mentioned material is in contact.

16. In an apparatus for forming a composite sheet of felt or paper, a container, a perforated paper-forming cylinder mounted within the container, means for supplying paper-making material in the form of a watery pulp within the container and in contact with a portion of the cylinder, a plurality of means located a comparatively small distance below the level of the said material for supplying other paper-making material in the form of watery pulp at a plurality of points of that portion of the cylinder with which the first-mentioned material is in contact, and baffle means for preventing any undesirable mixture of the two materials.

In testimony whereof I affix my signature.

RAY P. PERRY.